United States Patent
Fukuda (10) Patent No.: US 9,052,929 B2
(45) Date of Patent: Jun. 9, 2015

(54) ELECTRONIC DEVICE, APPLICATION DETERMINATION METHOD, AND APPLICATION DETERMINATION PROGRAM

(75) Inventor: Kenji Fukuda, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 27 days.

(21) Appl. No.: 13/429,792

(22) Filed: Mar. 26, 2012

(65) Prior Publication Data

US 2012/0254894 A1 Oct. 4, 2012

(30) Foreign Application Priority Data

Mar. 28, 2011 (JP) .................................. 2011-069336

(51) Int. Cl.
*G06F 9/445* (2006.01)
*G06F 9/54* (2006.01)
*G06F 9/50* (2006.01)

(52) U.S. Cl.
CPC ................ *G06F 9/445* (2013.01); *G06F 9/542* (2013.01); *G06F 9/5038* (2013.01)

(58) Field of Classification Search
CPC .................................. G06F 9/445; G06F 9/542
See application file for complete search history.

(56) References Cited

U.S. PATENT DOCUMENTS

| 5,859,978 A * | 1/1999 | Sonderegger et al. | 709/226 |
| 6,324,546 B1 * | 11/2001 | Ka et al. | 717/170 |
| 8,037,456 B2 * | 10/2011 | Kawakami et al. | 717/127 |
| 8,205,211 B2 | 6/2012 | Kusuda et al. | |
| 2005/0177832 A1 * | 8/2005 | Chew | 718/104 |
| 2008/0263568 A1 | 10/2008 | Kusuda et al. | |
| 2009/0276788 A1 * | 11/2009 | Homma | 718/107 |
| 2009/0307710 A1 * | 12/2009 | Zarzycki et al. | 719/312 |
| 2009/0327482 A1 * | 12/2009 | Malhotra et al. | 709/224 |

FOREIGN PATENT DOCUMENTS

| JP | 2000-35880 A | 2/2000 |
| JP | 2002-297380 | 10/2002 |
| JP | 2006-072466 A | 3/2006 |
| JP | 2010-108331 | 5/2010 |

OTHER PUBLICATIONS

Notice of Reasons for Rejection issued to JP Application No. 2011-069339, mailed Sep. 30, 2014.
Notice of Reasons for Rejection issued to JP Application No. 2011-069336, mailed Sep. 30, 2014.

* cited by examiner

*Primary Examiner* — Charles E Anya
(74) *Attorney, Agent, or Firm* — Hoffman & Baron, LLP (57) ABSTRACT

The cellular telephone device includes a control unit that executes any one of a plurality of applications, and a storage unit that stores an execution count of an application executed by the execution unit. The control unit determines an application to be executed after terminating or suspending a predetermined application, based on the execution count stored in the storage unit.

5 Claims, 5 Drawing Sheets

| FIRST APPLICATION (51A) | FIRST DATA (51B) | SECOND APPLICATION (51C) | FIRST EXECUTION COUNT (51D) | FIRST USE COUNT (51E) | SECOND DATA (51F) | THIRD APPLICATION (51G) | SECOND EXECUTION COUNT (51H) | SECOND USE COUNT (51I) | |
|---|---|---|---|---|---|---|---|---|---|
| TWO-DIMENSIONAL BAR CODE IMAGING APPLICATION | URL | TEXT EDITOR | 69 | 40 | CHARACTER STRING | BROWSER APPLICATION | 41 | 28 | ... |
| | | | | | | MAIL APPLICATION | 23 | 14 | ... |
| | | BROWSER APPLICATION | 124 | 102 | MAIL ADDRESS | MAIL APPLICATION | 32 | 14 | ... |
| | | | | | | ADDRESS BOOK APPLICATION | 12 | 5 | ... |
| | | ... | ... | ... | ... | ... | ... | ... | ... |
| IMAGING APPLICATION | IMAGE FILE | FILE MANAGING APPLICATION | 89 | 70 | IMAGE FILE | MAIL APPLICATION | 14 | 10 | ... |
| | | PHOTO RETOUCHING APPLICATION | 89 | 69 | | ADDRESS BOOK APPLICATION | 8 | 3 | ... |
| | | ... | ... | ... | ... | | ... | ... | ... |
| ... | ... | ... | | | | | | | ... |

| | | | |
|---|---|---|---|
| PREDETERMINED APPLICATION | SECOND APPLICATION | THIRD APPLICATION | ... |
| TWO-DIMENSIONAL BAR CODE IMAGING APPLICATION | BROWSER APPLICATION | MAIL APPLICATION | ... |
| IMAGING APPLICATION | FILE MANAGING APPLICATION | MAIL APPLICATION | ... |
| ... | ... | ... | ... |

FIG. 5

ELECTRONIC DEVICE, APPLICATION DETERMINATION METHOD, AND APPLICATION DETERMINATION PROGRAM

This application is based on and claims the benefit of priority from Japanese Patent Application No. 2011-069336, filed on 28 Mar. 2011, the content of which is incorporated herein by reference.

BACKGROUND OF THE INVENTION

1. Field of the Invention

The present invention relates to an electronic device, an application determination method, and an application determination program, for determining an application to be consecutively executed after terminating or suspending a predetermined application.

2. Related Art

Conventionally, an electronic device has been provided, which is capable of storing a plurality of applications, and activating at least one of the plurality of applications. For example, Japanese Unexamined Patent Application, Publication No. 2000-035880 has proposed a devise that is capable of manually switching a plurality of applications.

SUMMARY OF THE INVENTION

Incidentally, as a result of increasing storage capacity, electronic devices in recent years can store a multitude of applications. Therefore, when a user of the electronic device executes a regularly used application, in a case in which the user selects such an application from among a plurality of applications, there has been a possibility for an operation to be complicated. Accordingly, it is required for an appropriate application to be automatically activated at preferable timing for a user.

An object of the present invention is to provide an electronic device, an application determination method, and an application determination program, all of which can automatically activate an appropriate application at preferable timing for a user.

An electronic device according to the present invention includes: an execution unit that executes any one of a plurality of applications; a storage unit that stores an execution count of the applications executed by the execution unit; and a control unit that determines an application to be consecutively executed after terminating or suspending a predetermined application, based on the execution count stored in the storage unit, in which the execution unit activates an application determined by the control unit, in a case in which the predetermined application is terminated or suspended.

Moreover, in the electronic device according to the present invention, it is preferable for the storage unit to associate and store the plurality of applications, other applications consecutively executed after terminating or suspending the plurality of applications, and execution counts of the other applications; and it is preferable for the control unit to determine an application, which has been most frequently executed consecutively after terminating or suspending the predetermined application, as an application to be executed in a case in which the predetermined application is terminated or suspended, based on the execution counts stored in the storage unit.

In addition, in the electronic device according to the present invention, it is preferable for the predetermined application to create first data; it is preferable for the storage unit to further store a first use count that is a use count of the first data in each of the applications consecutively executed after terminating or suspending the predetermined application; and in a case in which there are a plurality of applications that have been most frequently executed consecutively after terminating or suspending the predetermined application, it is preferable for the control unit to determine an application, the first use count thereof stored in the storage unit being frequent, as an application to be consecutively executed after terminating or suspending the predetermined application.

Furthermore, in the electronic device according to the present invention, it is preferable that each of the applications consecutively executed after terminating or suspending the predetermined application can create second data based on the first data; it is preferable for the storage unit to further store a second use count that is a use count of the second data in each of the plurality of applications; and it is preferable for the control unit to determine an application, which is consecutively executed after terminating or suspending an application to be executed in response to terminating or suspending the predetermined application, as an application, the second use count thereof stored in the storage unit being frequent.

An application determination method according to the present invention is an application determination method for determining an application to be executed by an electronic device that executes any one of a plurality of applications, in which the electronic device includes a storage unit that stores an execution count of an application that has been executed, and the application determination method includes a step of determining an application to be consecutively executed after terminating or suspending a predetermined application, based on the execution count stored in the storage unit.

The application determination method according to the present invention is an application determination program for causing an electronic device, which executes any one of a plurality of applications, to execute processing of determining an application to be executed, in which the processing includes: storing an execution count of an application, which has been executed by the electronic device, in a storage unit of the electronic device; and determining an application to be consecutively executed after terminating or suspending a predetermined application, based on the execution count stored in the storage unit.

According to the present invention, an appropriate application can be automatically activated at preferable timing for a user.

DETAILED DESCRIPTION OF THE INVENTION

Figure 1:
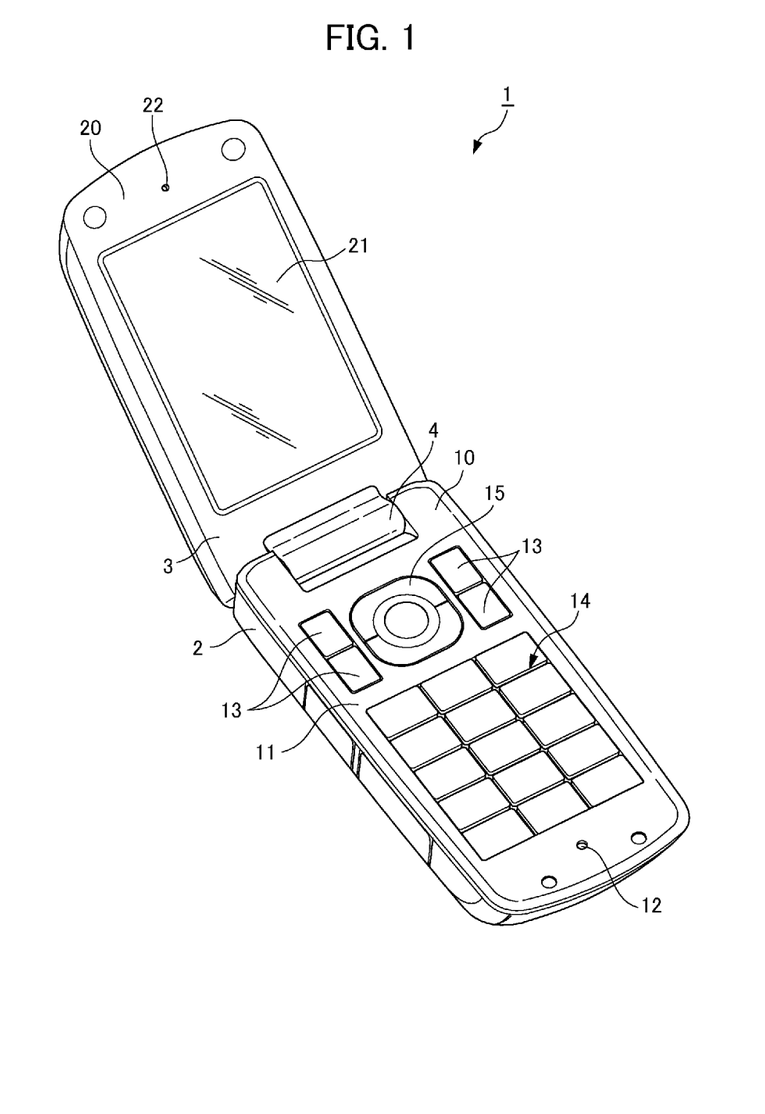
FIG. 1 is a perspective view showing an appearance of a cellular telephone device according to the present embodiment.

Descriptions are provided hereinafter regarding an embodiment of the present invention. First of all, with reference to FIG. 1, descriptions are provided for a basic structure of a cellular telephone device 1 according to an embodiment of the electronic device of the present invention. FIG. 1 is a perspective view showing an appearance of the cellular telephone device 1 according to the present embodiment.

It should be noted that, although FIG. 1 shows what is called a folding-type cellular telephone device, the cellular telephone device according to the present invention is not particularly limited thereto. For example, the cellular telephone device may be of: a rotating (turning) type in which one of the bodies slides to one direction in a state in which the bodies are mutually superimposed; or a type (straight type) in which an operation unit and a display unit are disposed in one body without having a connecting portion.

The cellular telephone device 1 is configured to include an operation unit side body 2 and a display unit side body 3.

The operation unit side body 2 is configured to include, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone function and a mail function; input operation keys 14 for inputting the digits of a telephone number and characters for mail, etc.; and a selection operation key 15 for performing selection of the various operations, scrolling, etc.

Moreover, the display unit side body 3 is configured to include, on a front face portion 20, an LCD (Liquid Crystal Display) display unit 21 for displaying a variety of information, and a speaker 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
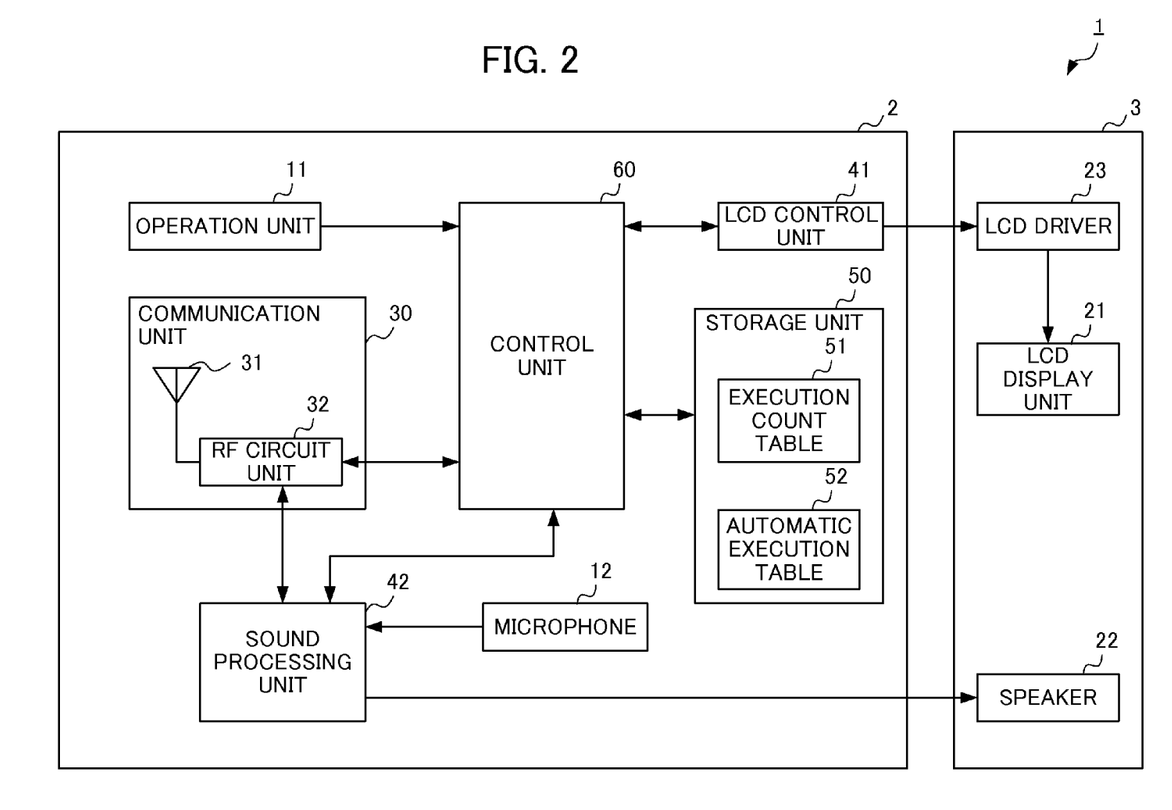
FIG. 2 is a functional block diagram showing functions of the cellular telephone device according to the present embodiment.

FIG. 2 is a functional block diagram showing functions of the cellular telephone device 1 according to the present embodiment.

As shown in FIG. 2, in the cellular telephone device 1, the operation unit side body 2 includes an operation unit 11, a microphone 12, a communication unit 30, an LCD control unit 41, a sound processing unit 42, a storage unit 50, and a control unit 60. Moreover, in the cellular telephone device 1, the display unit side body 3 includes an LCD display unit 21, a speaker 22, and an LCD driver 23.

The communication unit 30 performs transmission and reception of signals with an external device such as a base station (not illustrated). The communication unit 30 includes a main antenna 31 as an antenna, and an RF circuit unit 32.

The main antenna 31 performs transmission and reception of a high frequency signal with the external device such as the base station, the high frequency signal being modulated with a predetermined modulation method.

The RF circuit unit 32 processes the high frequency signal transmitted and received via the main antenna 31. More specifically, when the main antenna 31 receives the signal, the RF circuit unit 32 demodulates the signal with a predetermined demodulation method, and transmits the signal thus processed to the control unit 60. In addition, the RF circuit unit 32 modulates the signal transmitted from the control unit 60 with a predetermined modulation method, and transmits the signal to the external device such as the base station via the main antenna 31.

The LCD control unit 41 executes predetermined image processing in accordance with control by the control unit 60, and outputs image data thus processed to the LCD driver 23. The LCD driver 23 includes frame memory, and stores the image data transmitted from the LCD control unit 41 in the frame memory. The LCD driver 23 outputs the image data stored in the frame memory to the LCD display unit 21 or a sub LCD display unit (not illustrated) at predetermined timing.

The sound processing unit 42 executes predetermined sound processing in accordance with control by the control unit 60, and outputs a signal thus processed to the speaker 22. The speaker 22 externally outputs the signal that is transmitted from the sound processing unit 42. Furthermore, the sound processing unit 42 processes a signal that is input from the microphone 12, and outputs the signal thus processed to the control unit 60.

For example, the storage unit 50 is configured with memory and the like for storing information, and is utilized for arithmetic processing by the control unit 60. Moreover, the storage unit 50 stores applications, various programs and the like according to the present embodiment. It should be noted that the storage unit 50 may also serve as detachable external memory.

In addition, the storage unit 50 includes: an execution count table 51 that stores an execution count of each application executed by the control unit 60 (to be described later); and an automatic execution table 52 that stores applications to be consecutively executed.

Figure 3:
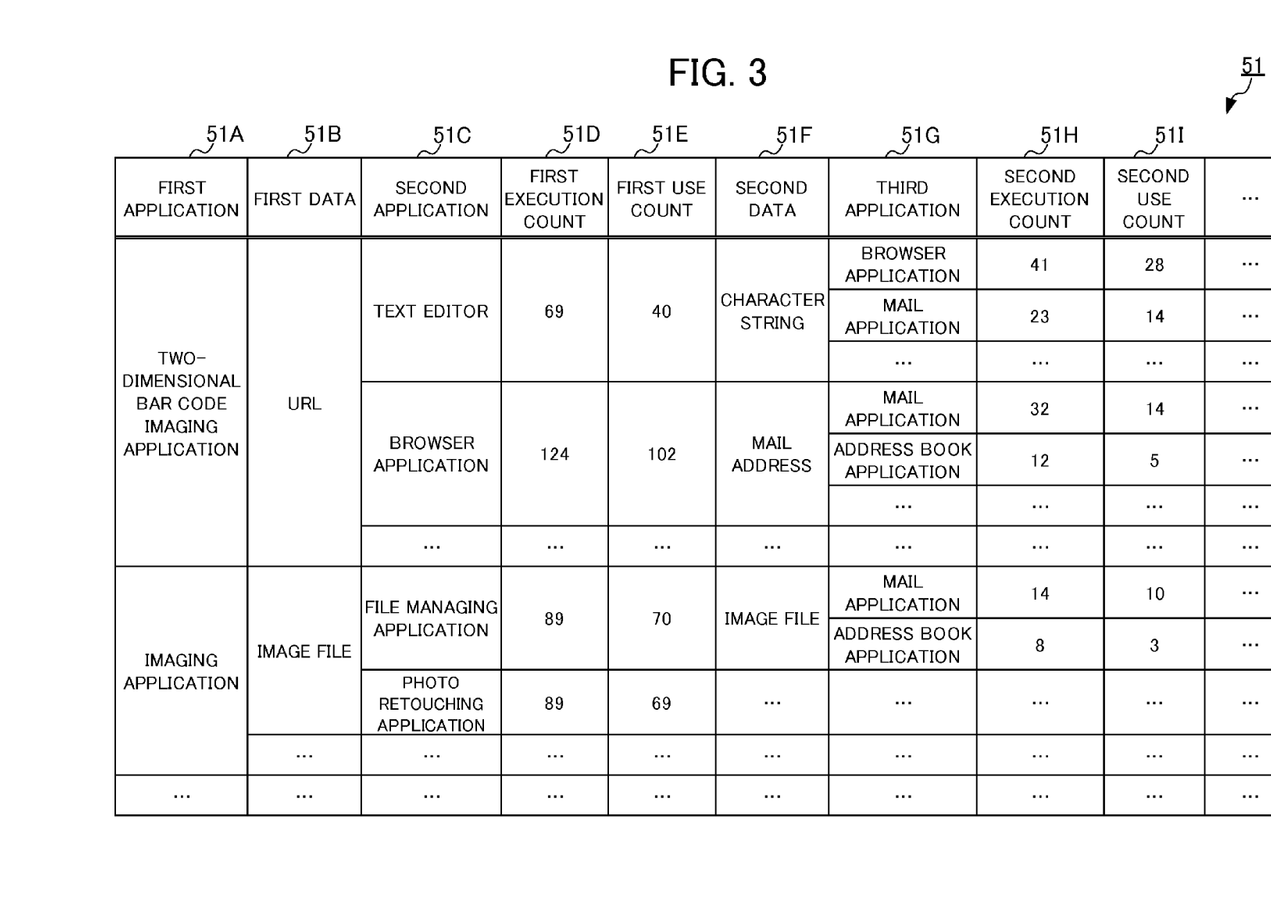
FIG. 3 is a table showing an execution count table according to the present embodiment.

FIG. 3 is a table showing the execution count table 51 according to the present embodiment. The execution count table 51 associates and stores: a first application 51A as a predetermined application; first data 51B that is generated by the predetermined application; a second application 51C as another application consecutively executed after terminating or suspending the predetermined application; a first execution count 51D that shows an execution count of the second application executed after the first application; a first use count 51E that shows a use count of the first data used by the second application; and second data 51F that is generated based on the first data.

Furthermore, the execution count table 51 associates and stores: a third application 51G as another application consecutively executed after terminating or suspending the second application 51C; a second execution count 51H that shows an execution count of the third application executed after the second application; and a second use count 51I that shows a use count of the second data used by the third application.

It should be noted that, although the association between consecutively executed applications is stored in the execution count table 51 shown in FIG. 3 in the present embodiment, it is not limited thereto, and the data stored in the execution count table 51 may be stored as being divided into a plurality of tables.

Figure 4:
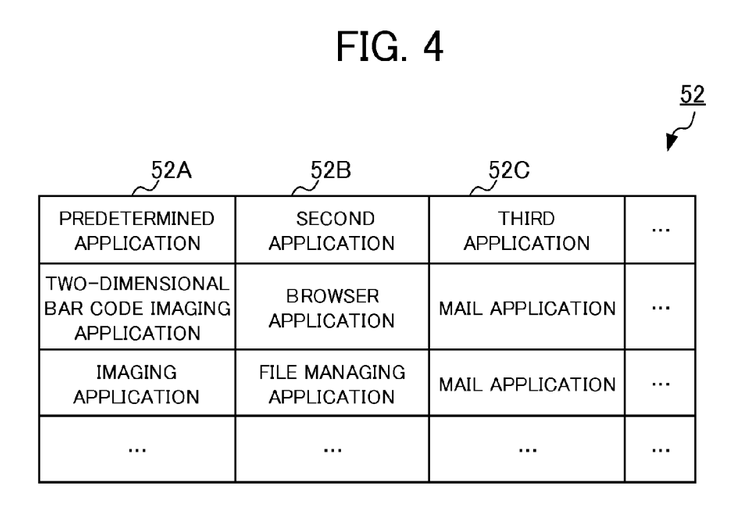
FIG. 4 is a table showing an automatic execution table according to the present embodiment.

FIG. 4 is a table showing the automatic execution table 52 according to the present embodiment. The automatic execution table 52 associates and stores: a predetermined application 52A; a second application 52B to be automatically executed after terminating or suspending the predetermined application; and a third application 52C to be automatically executed after terminating or suspending the second application.

Descriptions are provided by returning to FIG. 2. The control unit 60 controls the entirety of the cellular telephone device 1, and performs predetermined control of, for example, the communication unit 30, the LCD control unit 41, the sound processing unit 42 and the like. Moreover, the control unit 60 functions as an execution unit, accepts an input from the operation unit 11 and the like, and executes any one of a plurality of applications. In addition, when executing such processing, the control unit 60 controls the storage unit 50 to read various programs and data and write data.

In the cellular telephone device 1 with such a configuration, the control unit 60 determines an application to be consecutively executed after terminating or suspending a predetermined application, based on an execution count stored in the storage unit 50. Detailed descriptions are provided hereinafter regarding the control unit 60.

The control unit 60 determines an application (the second application) to be consecutively executed after terminating or suspending a predetermined application (for example, a two-dimensional bar code imaging program), based on the first execution count 51D stored in the execution count table 51 in the storage unit 50.

More specifically, the control unit 60 extracts the second applications associated with the predetermined application from the execution count table 51. Furthermore, the control unit 60 determines the second application, the first execution count 51D thereof stored in the execution count table 51 being the most frequent among the extracted second applications, as an application to be consecutively executed after terminating or suspending the predetermined application.

More specific descriptions are provided with reference to FIGS. 3 and 4. Firstly, by controlling the two-dimensional bar code imaging application and an imaging unit (not illustrated), the control unit 60 extracts text data (the first data) representing a URL, from a two-dimensional bar code captured by the imaging unit.

Next, in a case in which the two-dimensional bar code imaging application is terminated or suspended by the user operating the operation unit 11, the control unit 60 determines an application to be consecutively activated after the two-dimensional bar code imaging application, by referring to the execution count table 51 stored in the storage unit 50.

More specifically, firstly, the control unit 60 refers to the execution count table 51 for the second applications 51C stored as applications that have ever been consecutively executed after the two-dimensional bar code imaging application, and for the execution counts (the first execution counts 51D) of the second applications 51C in the past record.

Subsequently, the control unit 60 activates a browser application, the first execution count 51D thereof being 124 and the most frequent, as an application to be consecutively activated after the two-dimensional bar code imaging application.

Moreover, among the second applications thus extracted, in a case in which there are a plurality of second applications, the first execution counts 51D thereof stored in the execution count table 51 being the most frequent, the control unit 60 determines a second application, the first use count 51E thereof stored in the execution count table 51 in the storage unit 50 being the most frequent, as an application to be consecutively executed after terminating or suspending the predetermined application.

More specific descriptions are provided regarding this with reference to FIGS. 3 and 4. For example, it is assumed that the control unit 60 firstly activates an imaging application that is an application for taking a picture of a subject by the imaging unit.

After activating the imaging application, the control unit 60 creates an image file (the first data) of the subject, based on the user's operation of the operation unit 11. In addition, after creating the image file, when the operation unit 11 is operated to terminate the application, the control unit 60 terminates the imaging application, and starts referring to the execution count table 51 in the storage unit 50.

In a manner similar to the manner described above, the control unit 60 refers to the execution count table 51 for the second applications 51C associated with the imaging application. In this case, a file managing application and a photo retouching application are stored as the second applications 51C in the execution count table 51.

However, the first execution counts 51D of the file managing application and the photo retouching application are each 89 and the most frequent. In such a case, the control unit 60 refers to the first use counts 51E, and determines the second application 51C, the first use count 51E thereof being the most frequent, as an application to be consecutively activated after the imaging application.

More specifically, in the present embodiment, since the first use count 51E of the file managing application is 70 and the most frequent, an application to be consecutively activated after the imaging application is the file managing application.

Furthermore, the control unit 60 determines an application to be consecutively executed after terminating or suspending the application to be consecutively executed after terminating or suspending the predetermined application, based on the second use counts 51I stored in the execution count table 51 in the storage unit 50. The second use counts 51I are created based on the first data.

In other words, the control unit 60 extracts the third applications associated with an application to be consecutively executed after terminating or suspending the predetermined application, and extracts the second use counts, based on the execution count table 51. Moreover, the control unit 60 determines the third application, the second use count thereof being the most frequent, as an application to be consecutively executed.

More specific descriptions are provided regarding this with reference to FIGS. 3 and 4. For example, it is assumed that the control unit 60 firstly activates an imaging application that is an application for taking a picture of a subject by way of the imaging unit.

As described above, the control unit 60 terminates the imaging application, and starts referring to the execution count table 51 in the storage unit 50.

In addition, in a manner similar to the manner described above, the control unit 60 refers to the execution count table 51 for the second applications 51C associated with the imaging application. In this case, a file managing application and a photo retouching application are stored as the second applications 51C in the execution count table 51.

Furthermore, since the first execution count 51D of the file managing application and the photo retouching application are each 89 and the most frequent, the control unit 60 refers to the first use counts 51E, and determines the file managing application, the first use count 51E thereof being the most frequent, as an application to be consecutively activated after the imaging application.

Moreover, based on the user's operations or the like of the operation unit 11, an image file is created by the file managing application. Subsequently, when the operation unit 11 is operated to terminate the file managing application, the control unit 60 terminates the file managing application, and starts referring to the execution count table 51 in the storage unit 50.

In other words, the control unit 60 refers to the execution count table 51 for the third applications 51G associated with the file managing application. In this case, an mail application and an address book application are stored as the third applications 51G.

In addition, the control unit 60 refers to the use counts (the second use counts 51I) of the second data 51F (the image file) generated by file managing application and used by the mail application and the address book application. Furthermore, the control unit activates the mail application, the second use count 51I thereof being 10 and the most frequent, as an application to be consecutively activated after the file managing application.

It should be noted that the control unit 60 stores the second application determined as an application to be executed after terminating or suspending the predetermined application, and the third application determined as an application to be executed after terminating or suspending the second application, in the automatic execution table 52.

Moreover, via the operation unit 11, the control unit 60 accepts selection of whether consecutive execution of an application based on the automatic execution table 52 is permitted. The control unit 60 stores information on whether the automatic execution is permitted, in the storage unit 50.

In addition, in a case in which the automatic execution is permitted, after terminating or suspending the predetermined application, the control unit 60 automatically executes the second application, based on the automatic execution table 52. Furthermore, in a case in which the automatic execution is permitted, after terminating or suspending the second application, the control unit 60 automatically executes the third application, based on the automatic execution table 52.

Figure 5:
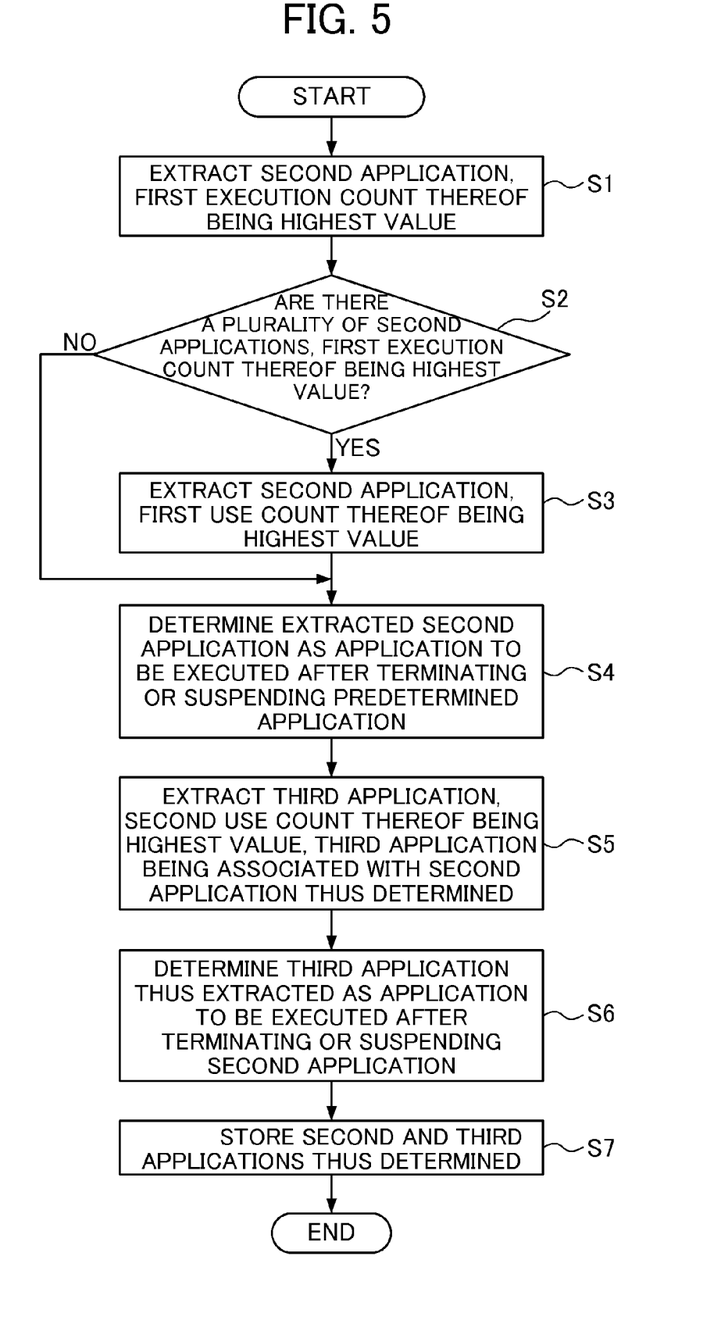
FIG. 5 is a flow chart showing a flow of processing by a control unit according to the present embodiment to determine an application to be consecutively executed after a predetermined application, in a case in which the predetermined application is terminated or suspended.

Next, descriptions are provided for a flow of processing by the control unit 60 to determine an application to be consecutively executed after the predetermined application. FIG. 5 is a flow chart showing a flow of processing by the control unit 60 according to the present embodiment to determine an application to be consecutively executed after the predetermined application, in a case in which the predetermined application is terminated or suspended.

In Step S1, the control unit 60 extracts the second application(s), the first execution count(s) thereof being the most frequent, the second application(s) being associated with the predetermined application in the execution count table 51.

In Step S2, the control unit 60 determines whether a plurality of the second applications, the execution counts of the second applications being the most frequent, were extracted in Step S1. In a case in which the determination is YES, the control unit 60 advances the processing to Step S3, and in a case in which the determination is NO, the control unit 60 advances the processing to Step S4.

In Step S3, the control unit 60 extracts the second application, the first use count thereof being the most frequent, from among the second applications extracted in Step S1.

In Step S4, the control unit 60 determines the second application, which was extracted through the processing in Steps S1 to S3, as an application to be executed after terminating or suspending the predetermined application.

In Step S5, the control unit 60 extracts the third application, the second use count thereof being the most frequent, the third application being associated with the second application determined in Step S4.

In Step S6, the control unit 60 determines the third application extracted in Step S5 as an application to be executed after terminating or suspending the second application determined in Step S5.

In Step S7, the control unit 60 stores the second application determined in Step S4 and the third application determined in Step S6, in the automatic execution table 52.

As described above, according to the present embodiment, in the cellular telephone device 1, the control unit 60 determines an application to be consecutively executed after terminating or suspending a predetermined application, based on an execution count stored in the execution count table 51 in the storage unit 50.

An application with a higher execution count is more likely to be executed than an application with a lower execution count, and therefore is appropriate as an application to be activated after a predetermined application. Moreover, based on an execution count, the cellular telephone device 1 determines an application to be consecutively executed after terminating or suspending the predetermined application; therefore, an appropriate application can be automatically activated at preferable timing for the user of the predetermined application.

In addition, based on the execution count stored in the execution count table 51 in the storage unit 50, the control unit 60 of the cellular telephone device 1 determines an application, which has been most frequently executed consecutively after terminating or suspending the predetermined application, as an application to be consecutively executed after terminating or suspending the predetermined application.

An application, which has been most frequently executed consecutively after terminating or suspending the predetermined application, is most likely to be consecutively executed after the predetermined application by the user. Therefore, the cellular telephone device 1 can select the most appropriate application as an application to be automatically activated.

Furthermore, in a case in which there are a plurality of applications that have been most frequently executed consecutively after terminating or suspending the predetermined application, the control unit 60 of the cellular telephone device 1 determines an application, the first use count 51E thereof stored in the execution count table 51 in the storage unit 50 being the most frequent, as an application to be consecutively executed after terminating or suspending the predetermined application.

Therefore, even in a case in which there are a plurality of applications that have been most frequently executed consecutively after terminating or suspending the predetermined application, the cellular telephone device 1 can narrow down applications to determine the application to be consecutively executed after terminating or suspending the predetermined application, based on the first use counts 51E.

Moreover, the control unit 60 determines an application to be consecutively executed after terminating or suspending the application to be executed in response to terminating or suspending the predetermined application, based on the second use count 51I associated with the second data 51F stored in the execution count table 51 in the storage unit 50.

Therefore, the cellular telephone device 1 can select an application to be consecutively executed after terminating or suspending the application to be executed in response to terminating or suspending the predetermined application, based on the use count of the second data.

Although an embodiment of the present invention has been described above, the present invention is not limited to the aforementioned embodiment. In addition, the effects described in the embodiment of the present invention merely exemplify the most preferable effects arising from the present invention, and the effects according to the present invention are not limited to those described in the embodiment of the present invention.

What is claimed is:

1. An electronic device, comprising:
an execution unit that executes any one of a plurality of applications;
a storage unit that stores an execution count of the applications executed by the execution unit; and
a control unit that determines a next application to be executed after terminating or suspending a predetermined application, based on the execution count stored in the storage unit,
wherein, based on the execution count stored in the storage unit, the control unit determines a next application, which has been most frequently executed after terminating or suspending the predetermined application by a user, as the next application to be executed after terminating or suspending the predetermined application by the user,
wherein the execution unit executes the next application determined by the control unit, in a case in which the predetermined application is terminated or suspended by a user,
wherein the predetermined application creates first data,
wherein the storage unit further stores a first use count that represents a use count of the first data in each of the applications executed after terminating or suspending the predetermined application, and
wherein, in a case in which there are a plurality of applications that have been most frequently executed after terminating or suspending the predetermined application based on the execution count, the control unit determines an application of the plurality of applications that have been most frequently executed after terminating or suspending the predetermined application, having a most frequent first use count, as the application to be executed after terminating or suspending the predetermined application.

2. The electronic device according to claim 1, wherein the storage unit associates and stores:
the plurality of applications;
other applications executed after terminating or suspending the plurality of applications; and
execution counts of the other applications.

3. The electronic device according to claim 1, wherein each of the applications executed after terminating or suspending the predetermined application can create second data based on the first data, wherein the storage unit further stores a second use count that is a use count of the second data in each of the plurality of applications, and wherein the control unit determines an application, which is consecutively executed after terminating or suspending an application to be executed in response to terminating or suspending the predetermined application, as an application, the second use count thereof stored in the storage unit being frequent.

4. An application determination method that determines an application to be executed by an electronic device that executes any one of a plurality of applications, the method comprising:

storing, in a storage unit associated with the electronic device, an execution count of an application that has been executed;
determining a next application, which has been most frequently executed after terminating or suspending a predetermined application by a user, as the next application to be executed after terminating or suspending the predetermined application by the user, based on the execution count stored in the storage unit;
storing, in the storage unit a first use count, the first use count representing a use count of first data in each of the applications executed after terminating or suspending the predetermined application, the first data being created by the predetermined application; and
determining, by the electronic device, in a case in which there are a plurality of applications that have been most frequently executed after terminating or suspending the predetermined application based on the execution count, an application of the plurality of applications that have been most frequently executed after terminating or suspending the predetermined application, having a most frequent first use count, as the application to be executed after terminating or suspending the predetermined application.

5. An application determination program that causes an electronic device, which executes any one of a plurality of applications, to execute processing of determining an application to be executed, the processing comprising:

storing an execution count of an application, which has been executed by the electronic device, in a storage unit of the electronic device; and
determining a next application, which has been most frequently executed after terminating or suspending a predetermined application by a user, as the next application to be executed after terminating or suspending the predetermined application by the user, based on the execution count stored in the storage unit;
storing, in the storage unit a first use count, the first use count representing a use count of first data in each of the applications executed after terminating or suspending the predetermined application, the first data being created by the predetermined application; and
determining, by the electronic device, in a case in which there are a plurality of applications that have been most frequently executed after terminating or suspending the predetermined application based on the execution count, an application of the plurality of applications that have been most frequently executed after terminating or suspending the predetermined application, having a most frequent first use count, as the application to be executed after terminating or suspending the predetermined application.

* * * * *